United States Patent [19]

Brooks et al.

[11] Patent Number: 4,979,908

[45] Date of Patent: Dec. 25, 1990

[54] ELECTRICAL CONNECTOR DEVICE

[75] Inventors: Gary W. Brooks, Scipio, Ind.; Victor Mastis, St. Petersburg, Fla.

[73] Assignee: The Grote Manufacturing Co., Madison, Ind.

[21] Appl. No.: 319,537

[22] Filed: Mar. 6, 1989

[51] Int. Cl.[5] .............................................. A01R 13/52

[52] U.S. Cl. .................................... 439/281; 439/588

[58] Field of Search ............... 439/278, 280, 281, 283, 439/587-589, 592

[56] References Cited

U.S. PATENT DOCUMENTS 3,458,852 7/1969 Higgens, Jr. ........................ 439/281

FOREIGN PATENT DOCUMENTS 890377 2/1962 United Kingdom ................ 439/281

*Primary Examiner*—Steven C. Bishop
*Attorney, Agent, or Firm*—Jon C. Winger

[57] ABSTRACT

An electrical connector device which provides for a sealed, weather-proof electrical connection in an electrical circuit. The electrical connector device includes a first housing element having a pair of first electrical fittings projecting therefrom and a second housing element having a pair of second electrical fittings projecting therefrom so that when the first and second housing elements are positioned next to each other the first and second electrical fittings cooperate with each other to complete an electrical connection. The first housing element also includes a pair of circumferential first flanges, each first flange surrounding a different one of the first electrical fittings, and the second housing element also includes two sets of concentric second and third circumferential flanges, each set surrounding a different one of the second electrical fittings. When the first and second housing elements are positioned next to each other with the first electrical fittings electrically connected to the second electrical fittings, the first circumferential flanges are each received in the annular space between the second and third circumferential flanges of a different one of the sets of second and third circumferential flanges to create a seal around each of the interconnected first and second electrical fittings.

13 Claims, 2 Drawing Sheets

ELECTRICAL CONNECTOR DEVICE

BACKGROUND OF THE INVENTION

The present invention relates to electrical connector devices, and more particularly to a moisture proof electrical connector which can be connected and disconnected without tools.

Electrical connector devices which can be connected and disconnected without tools are generally known. Electrical connector devices which are weather proof or moisture proof are also generally known. However, no prior-art electrical connector known to me includes effective moisture-proof barriers and which can also be rapidly connected and disconnected without the use of tools.

SUMMARY OF THE INVENTION

The present invention provides a novel electrical connector device which can be connected and disconnected without tools and is moisture proof.

The present invention further provides an electrical connector device of the class described above which comprises a first housing element, a pair of electrical fittings projecting from one wall of the first housing element, a pair of first circumferential flanges projecting outwardly from the same wall of the first housing element as the first electrical fittings, each first circumferential flange surrounding a different one of the first electrical fittings, a second housing element, a pair of second electrical fittings projecting from one wall of the second housing element for connection to the first electrical fittings, a pair of second circumferential flanges projecting outwardly from the same wall of the second housing element as the second electrical fittings, each circumferential second flange surrounding a different one of the second electrical fittings, a pair of third circumferential flanges projecting outwardly from the same wall of the second housing element as the second electrical fittings, each circumferential third flange being spaced from and concentrically surrounding a different one of the second circumferential flanges thereby forming two sets of concentric second and third circumferential flanges with an annular space between the second and third circumferential flanges of each set, the first circumferential flanges, second circumferential flanges, and third circumferential flanges being sized so that each of the first circumferential flange is sized to fit into the annual space defined by a different one of the two sets of second and third circumferential flanges and in contact with both the second circumferential flange and third circumferential flange thereof, with each of the first electrical fittings in electrical interconnection with a different one of the second electrical fittings, and with each of the first circumferential flanges of the first housing element are received into a different one of the annular spaces defined by the two sets of concentric second and third circumferential flanges.

BRIEF DESCRIPTION OF THE DRAWINGS

The better understanding of the present invention will be had upon reference to the following description in conjunction with the accompanying drawings wherein like numerals refer to like parts throughout the several views and in which.

DETAILED DESCRIPTION OF THE PREFERRED EMBODIMENTS

Figure 1:
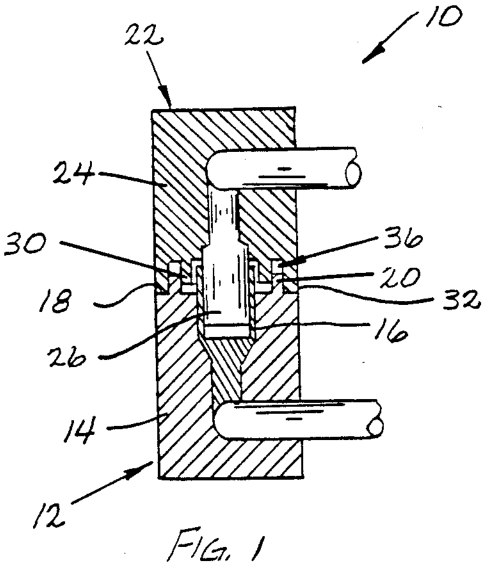
FIG. 1 is a cross-sectional side view of an electrical connector of the present invention.
Figure 2:
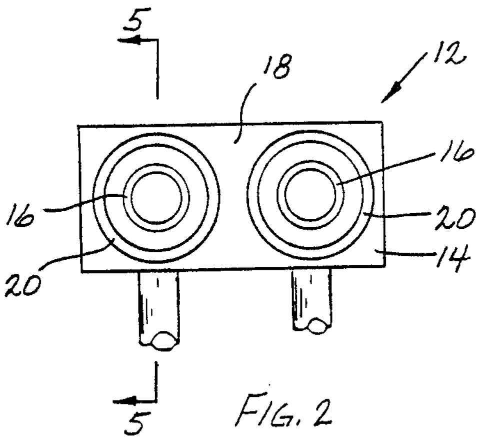
FIG. 2 is a front view of one component of the electrical connector device of the present invention.
Figure 3:
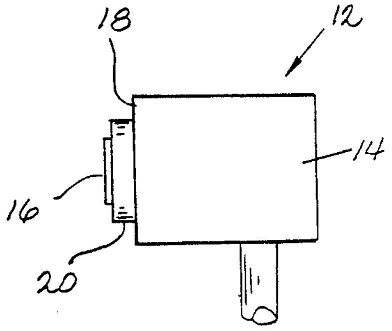
FIG. 3 is a side view of the component of FIG. 2.
Figure 4:
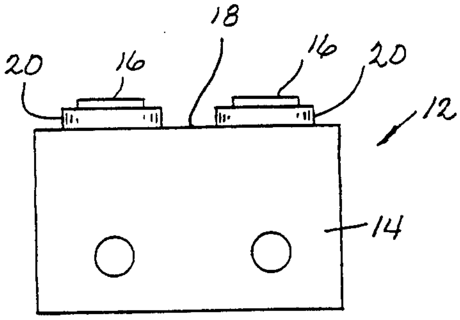
FIG. 4 is an end view of the component of FIG. 2.
Figure 5:
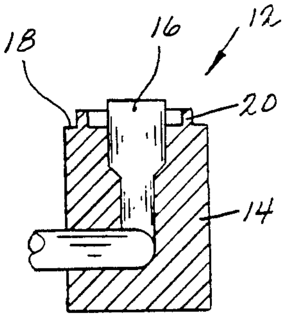
FIG. 5 is a cross-sectional view as seen in the direction of arrows 5—5 in FIG. 2.
Figure 6:
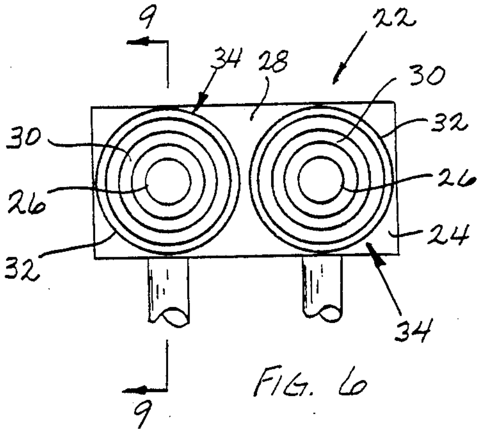
FIG. 6 is a front view of another component of the electrical connector device of the present invention which removably connects to the component of FIG. 2.
Figure 7:
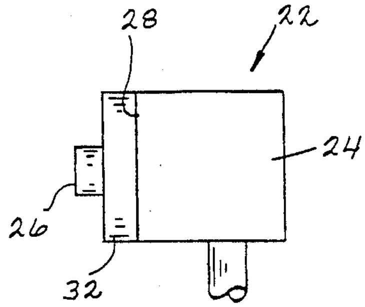
FIG. 7 is a side view of the component of FIG. 6.
Figure 8:
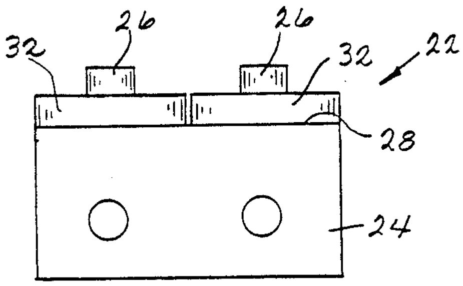
FIG. 8 is an end view of the component of FIG. 6.
Figure 9:
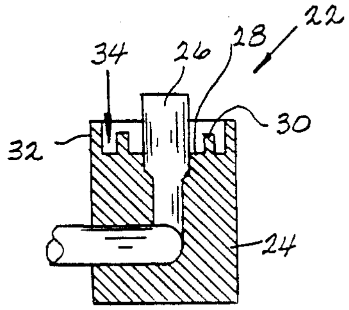
FIG. 9 is a cross-sectional view as seen in the direction of arrows 9—9 in FIG. 6.

With reference to FIGS. 1–5, there is shown an electrical connector device 10 having a socket component 12 and a mating jack component 22.

The socket component 12 is shown as including a first housing element 14 having a pair of first electrical fittings 16 projecting from one wall 18 of the first housing element 14. Electrical wires extend into the first housing element 14 and are connected to the electrical fittings 16 inside the first housing element 14.

A pair of first circumferential flanges 20 are integrally formed with the first housing element 14 and project outwardly from the same wall 18 of the first housing element 14 as the first electrical fittings 16. Each first circumferential flange 20 surrounds a different one of the first electrical fittings 16.

With reference to FIGS. 6–9, the jack component 22 is shown as including a second housing element 24 having a pair of second electrical fittings 26 projecting from one wall 28 of the second housing element 24. Electrical wires extend into the second housing element 24 and are connected to the second electrical fittings 26 inside the second housing element 24. The first electrical fittings 16 are adapted for connection to the second electrical fittings 26. Toward this objective, the first electrical fittings 16 are shown as female fittings and the second electrical fittings 26 are shown as male fittings which are received in the female fittings 16. However, it is contemplated that the first electrical fittings 16 could be male fittings and the second electrical fittings 26 could be female fittings.

A pair of second circumferential flanges 30 are integrally formed with the second housing element 24 and project outwardly from the same wall 28 of the second housing element 24 as the second electrical fittings 26. Each second circumferential flange 30 surrounds a different one of the second electrical fittings 26.

A pair of third circumferential flanges 32 are integrally formed with the second housing element 24 and project outwardly from the same wall 28 of the second housing element 24 as the second electrical fittings 26. Each circumferential third flange 32 is spaced from and concentrically surrounds a different one of the second circumferential flanges 30 thereby forming two sets of concentric second 30 and third 32 circumferential flanges with an annular space 34 defined between the second and third flanges of each set.

With reference to FIGS. 1–9, the first circumferential flanges 20, second circumferential flanges 30, and third circumferential flanges 32 are sized so that each circumferential first flange 20 fits into the annular space 34 defined by the second and third circumferential flanges 30, 32 of each set, and in contact with both the second circumferential flange 30 and third circumferential flange 32 thereof. Toward this objective, the inside circumferential dimension of the third circumferential flange 32 is at least equal to the outside circumferential dimension of the first circumferential flange 20, and the outside circumferential dimension of the second circumferential flange 30 is at least equal to the inside circumferential dimension of the first circumferential flange 20. Preferably, the inside circumferential dimension of the third circumferential flange 32 is somewhat smaller than the outside circumferential dimension of the first circumferential flange 20, and the outside circumferential dimension of the second circumferential flange 30 is somewhat larger than the inside circumferential dimension of the first circumferential flange 20. Thusly, the first circumferential flange 20 is received in the annular space 34 with a press fit, and preferably an interference fit with both the second circumferential flange 30 and the third circumferential flange 32. Preferably, the interference fit between the third circumferential flange 32 and first circumferential flange 20 is greater than the interference fit between the second circumferential flange 30 and the first circumferential flange 20.

It has been found advantageous that at least the second circumferential flange 30 and the third circumferential flange 32 be fabricated of an elastic material such as for example polyvinyl chloride having a 90 durometer. This construction provides for the resilient flexing of the second and third circumferential flanges 30, 32 as the first circumferential flange 20 is inserted in the annular space 34 therebetween, and therefore, produces a tight interface between the first circumferential flange 20 and the second and third circumferential flanges 30, 32. This tight interface provides a moisture-tight seal between the first circumferential flange 20 and the second circumferential flange 30 as well as between the first circumferential flange 20 and the third circumferential flange 32. [This tight interface also generates a friction contact between the first flange 20 and each of the second and third flanges 30, 32 which functions to hold the first wall 20 in the annular space 34 preventing inadvertent removal or separation of the first circumferential flange 20 from the annular space 34.]

With particular reference to FIG. 1, with wall 18 of the first housing element 14 and the wall of the second housing element 24 mutually facing each other and with the first electrical fittings 16 each electrically interconnect with a different one of the second electrical fittings 26, the first circumferential flanges 20 of the first housing element 14 are each received into a different one of the annular spaces 34 defined by the two sets of concentric second and third circumferential flanges 30, 32 of the second housing element 24. Further, each of the first circumferential flanges 20 cooperates with the second and third circumferential flanges 30, 32 to define an air space 36 over the distal end of the first circumferential flange received in the annual space 34. Toward this objective, at least the third circumferential flanges 32 project a greater from the wall 28 of the second housing element 24 than the distance that the first circumferential flanges 20 project from the wall 18 of the first housing element 14. When the first electrical fittings 16 of the first housing element 14 and the second electrical fittings 26 of the second housing element 24 mutually engage, the distal end of the third circumferential flanges 32 abut the wall 18 of the first housing element 14 from which the first circumferential flange 20 projects. It is also contemplated that the second circumferential flanges 30 could also project a greater distance from the wall 28 of the second housing element 24 than the distance that the first circumferential flanges 20 project from the wall 18 of the first housing element 14.

Therefore, it can be readily appreciated that the present invention provides an electrical connector which can be disconnected by merely pulling the socket 12 and jack 22 apart and connected by pushing the socket 12 and jack 22 components together without the use of tools and which further provides a moisture-proof seal therebetween.

Figure 10:
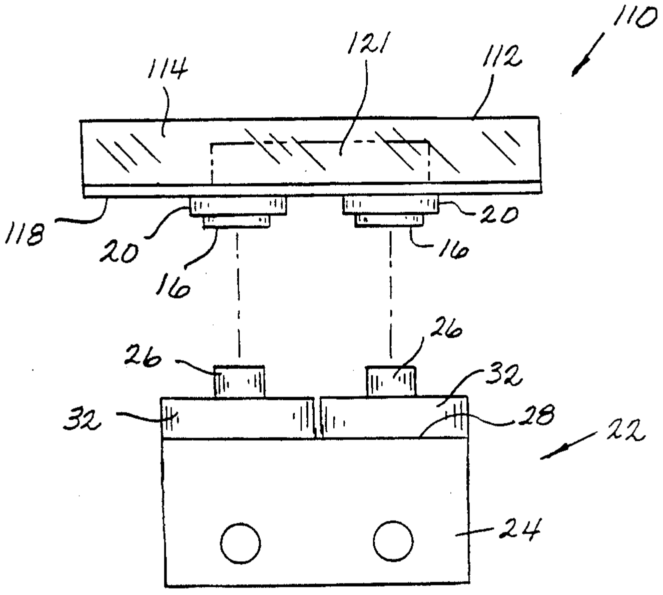
FIG. 10 is an exploded side view of another embodiment of the electrical connector device of the present invention with an alternative embodiment of the component of FIG. 2.

With reference to FIG. 10, there is shown an alternative embodiment of the electrical connector device of the present invention, which is generally denoted as the numeral 110. The electrical connector device 110 has many features in common with the electrical connector device 10. The common features are denoted by like numerals and, therefore, for the sake of brevity the description of the common features will not be repeated in detail. In the electrical connector device 110, an electric lamp 112 is used in place of the socket component 12 and the jack component 22 is removably connected to the lamp 112. Such lamps 112 have particular utility in motor vehicles as side marker lamps and the like.

The lamp 112 includes a lamp housing 114 having a back wall 118, a transparent or translucent lens cover 119 attached to the lamp back wall 118, and a light bulb 121 located inside of the lamp housing 114. The first pair of first electrical fittings 16 project from the lamp housing back wall 118 and are electrically connected to the light bulb 121.

The pair of first circumferential flanges 20 are integrally formed with the lamp housing back wall 118 and project outwardly from the lamp housing back wall 118. Each first circumferential flange 20 surrounds a different one of the first electrical fittings 16. The jack component 22 fastens to the lamp housing 114 with the second electrical fittings 26 in electrical communication with the first electrical fittings 16, and the first circumferential flanges 20 received in the annular space 34 defined by the second and third circumferential flanges 30, 32 of each set of second and third circumferential flanges of the jack component 22 as described above in regard to the electrical connector device 10.

Motor vehicle marker lamps are subjected to atmospheric moisture, and water splashed up from the road. The electrical connector device provides a tight seal around the electrical fittings and a circuitous path at the interface of the first, second, and third circumferential flanges 20, 30, 32 which prevents moisture from migrating to the electrical fittings 16, 26. While providing an effective seal, the electrical connector device of the present invention also provides for the removal and replacement of a new electrical lamp 112 without the use of tools as may be required from time-to-time as the light bulb 121 may burn out. The present invention also provides for the rapid installation of marker lamps 112 on a high volume production line as the motor vehicles are being manufactured which, of course, reduces expenses to the manufacturer.

The foregoing detailed description is given primarily for clearness of understanding and no unnecessary limitations should be understood therefrom for modifications will become known to those skilled in the art upon reading this disclosure and may be made without departing from the spirit of the invention or scope of the appended claims.

We claim:

1. An electrical connector device comprising:
a first housing element;
first electrical fitting means at one wall of the first housing element;
first circumferential flange means projecting outwardly from the one wall of the first housing element and surrounding the first electrical fitting means;
a second housing element;
second electrical fitting means at one wall of the second housing element for connection to the first electrical fitting means to complete an electrical connection therebetween;
second circumferential flange means projecting outwardly from the one wall of the second housing element and surrounding the second electrical fitting means;
third circumferential flange means projecting outwardly from the one wall of the second housing element and concentrically surrounding the second circumferential flange means defining an annular space between the second circumferential flange means and third circumferential flange means; and,
the annular space being sized to receive the first circumferential flange means therein with the first circumferential flange means in contact with the second circumferential flange means, and in contact with the third circumferential flange means with a press fit between the first circumferential flange means and the second circumferential flange means and the third circumferential flange means; and
when the first circumferential flange means is received within the annular space, the first electrical fitting means and the second electrical fitting means are electrically interconnected with each other.

2. The electrical connector device of claim 1, wherein the first circumferential flange means fits into the annular space between the second and third circumferential flange means with an interference fit between the second and third circumferential flange means to provide friction contact with the first circumferential flange means and the second circumferential flange means, and between the first circumferential flange means and the third circumferential flange means.

3. The electrical connector device of claim 2, wherein the interference fit between the third circumferential flange means and the first circumferential flange means is greater than the interference fit between the second circumferential flange means and the first circumferential flange means.

4. The electrical connector device of claim 1, wherein the first circumferential flange means, the second circumferential flange means and the third circumferential flange means cooperate when the first circumferential flange means is received in the annular space to define an air space above the distal end of the first circumferential flange means.

5. The electrical connector device of claim 4, wherein at least the third circumferential flange means projects a greater distance from the one wall of the second housing element than the distance that the first circumferential flange projects from the one wall of the first housing element such that the distal end of the third circumferential flange means abuts the one wall of the first housing element when the first circumferential flange means is received in the annular space and the distal end of the circumferential first flange means is spaced from the bottom surface of the annular space.

6. The electrical connector device of claim 1, wherein the first electrical fittings are male fittings and the second electrical fittings are female fittings for receiving the first electrical fittings.

7. The electrical connector device of claim 1, wherein the first electrical fittings are female fittings and the second electrical fittings are male fittings receivable in the first electrical fittings.

8. The electrical connector device of claim 1, wherein:
the inside circumferential dimension of the third circumferential flange means is smaller than the outside circumferential dimension of the first circumferential flange means; and
the outside circumferential dimension of the second circumferential flange means is larger than the inside circumferential dimension of the first circumferential flange means;
whereby the first circumferential flange means is received in the annular space between the concentric second and third flange means with a press fit.

9. The electrical connector device of claim 8, wherein the first circumferential flange means is fabricated of an elastic material.

10. The electrical connector device of claim 8, wherein the second and third circumferential flange means is fabricated of an elastic material.

11. The electrical connector device of claim 1, wherein the first housing element comprises:
a lamp housing;
an electric light bulb disposed within the lamp housing; and,
the first electrical fittings being electrically connected to the electric light bulb.

12. The electrical connector device of claim 1, wherein the second housing element comprises:
a lamp housing;
an electric light bulb disposed within the lamp housing; and,
the second electrical fittings being electrically connected to the electric light bulb.

13. The electrical connector device of claim 1, wherein:
the first electrical fitting means comprises a pair of electrical fittings;
the first circumferential flange means comprises a pair of first circumferential flanges projecting outwardly from the wall of the first housing element, each first circumferential flange surrounding a different one of the first electrical fittings;
the second electrical fitting means comprises a pair of electrical fittings;
the second circumferential flange means comprises a pair of second circumferential flanges projecting outwardly from the wall of the second housing element, each second circumferential flange surrounding a different one of the second electrical fittings;

the third circumferential flange means comprises a pair of third circumferential flanges projecting outwardly from the wall of the second housing element, each third circumferential flange being spaced from and concentrically surrounding a different one of the circumferential second flanges thereby forming two sets of concentric second and third circumferential flanges with an annular space between the second and third flanges of each set; and, each annular space receives a different one of the circumferential first flanges therein.

* * * * *